United States Patent
Xu et al.

(10) Patent No.: US 11,843,129 B2
(45) Date of Patent: Dec. 12, 2023

(54) CONNECTING ASSEMBLY, BATTERY MODULE, BATTERY PACK, AND DEVICE USING BATTERY MODULE AS POWER SUPPLY

(71) Applicant: CONTEMPORARY AMPEREX TECHNOLOGY CO., LIMITED, Fujian (CN)

(72) Inventors: Wencai Xu, Ningde (CN); Xuguang Wang, Ningde (CN); Mu Qian, Ningde (CN); Jihua Yao, Ningde (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 101 days.

(21) Appl. No.: 17/565,887

(22) Filed: Dec. 30, 2021

(65) Prior Publication Data
US 2022/0181750 A1    Jun. 9, 2022

Related U.S. Application Data

(63) Continuation of application No. PCT/CN2020/121315, filed on Oct. 15, 2020.

(30) Foreign Application Priority Data

Oct. 21, 2019    (CN) .......................... 201910999598.2

(51) Int. Cl.
*H01M 50/507*    (2021.01)
*B60L 50/64*    (2019.01)
(Continued)

(52) U.S. Cl.
CPC ........... *H01M 50/507* (2021.01); *B60L 50/64* (2019.02); *H01M 50/209* (2021.01);
(Continued)

(58) Field of Classification Search
CPC ............. H01M 50/209; H01M 50/249; H01M 50/503; H01M 50/507; B60L 50/64
See application file for complete search history.

(56) References Cited

U.S. PATENT DOCUMENTS

| 2012/0148876 A1 | 6/2012 | Zeng et al. |
| 2014/0120407 A1 | 5/2014 | Hofer et al. |

(Continued)

FOREIGN PATENT DOCUMENTS

| CN | 103814461 A | 5/2014 |
| CN | 204303895 U | 4/2015 |

(Continued)

OTHER PUBLICATIONS

International Search Report dated Jan. 21, 2021 issued in PCT/CN2020/121315.

(Continued)

*Primary Examiner* — Jonathan G Jelsma
(74) *Attorney, Agent, or Firm* — Scully, Scott, Murphy & Presser, P.C.

(57) ABSTRACT

The present application discloses a connecting assembly, a battery module, a battery pack, and a device using the battery module as a power supply. The connecting assembly includes a plurality of connecting sheets and an insulating film, where each of the plurality of connecting sheets includes an adjusting portion and a connecting portion, the adjusting portion is configured as a protrusion connected between adjacent connecting portions, the connecting portion is configured to connect a battery cell of the battery module, and the insulating film is disposed on one side of each of the plurality of connecting sheets, and the insulating film is provided with a through hole disposed corresponding to the adjusting portion. Through the solutions in the present application, the problem that the insulating film is wrinkled and torn due to the protrusion is avoided, and the manufac- (Continued)

turing efficiency of the connecting assembly can be improved.

13 Claims, 8 Drawing Sheets

(51) Int. Cl.
  *H01M 50/249* (2021.01)
  *H01M 50/209* (2021.01)
  *H01M 50/503* (2021.01)
(52) U.S. Cl.
  CPC ....... *H01M 50/249* (2021.01); *H01M 50/503* (2021.01); *H01M 2220/20* (2013.01)

(56) References Cited

U.S. PATENT DOCUMENTS

| | | | |
|---|---|---|---|
| 2017/0271642 | A1 | 9/2017 | Groshert et al. |
| 2018/0261804 | A1 | 9/2018 | Bayles et al. |

FOREIGN PATENT DOCUMENTS

| | | | |
|---|---|---|---|
| CN | 106169549 | A | 11/2016 |
| CN | 206878083 | U | 1/2018 |
| CN | 107785526 | A | 3/2018 |
| CN | 109103405 | A | 12/2018 |
| CN | 109390537 | A | 2/2019 |
| CN | 208767383 | U | 4/2019 |
| CN | 208806294 | U | 4/2019 |
| CN | 109830640 | A | 5/2019 |
| CN | 209029462 | U | 6/2019 |
| CN | 209357817 | U | 9/2019 |
| CN | 210743992 | U | 6/2020 |
| CN | 210744018 | U | 6/2020 |
| CN | 210744068 | U | 6/2020 |
| JP | 2010097722 | A | 4/2010 |
| JP | 2013196932 | A | 9/2013 |
| JP | 2016018634 | A | 2/2016 |
| JP | 2016207427 | A | 12/2016 |
| JP | 6299537 | B2 | 3/2018 |
| KR | 20140027079 | A | 3/2014 |
| KR | 20190092588 | A | 8/2019 |
| WO | 2018126272 | A1 | 7/2018 |

OTHER PUBLICATIONS

Extended European Search Report dated May 10, 2022 received in European Patent Application No. EP 20878110.4.
Notice of Reasons for Refusal dated May 29, 2023 received in Japanese Patent Application No. JP 2022-523699.
Notice of Allowance dated Oct. 6, 2023 received in Korean Patent Application No. KR 10-2022-7013435.

CONNECTING ASSEMBLY, BATTERY MODULE, BATTERY PACK, AND DEVICE USING BATTERY MODULE AS POWER SUPPLY

CROSS-REFERENCE TO RELATED APPLICATION

This application is a continuation of International Application No. PCT/CN2020/121315, filed on Oct. 15, 2020, which claims priority to Chinese Patent Application No. 201910999598.2, filed on Oct. 21, 2019. The disclosures of the aforementioned applications are hereby incorporated by reference in their entireties.

TECHNICAL FIELD

The present application relates to the technical field of batteries, and more particularly, to a connecting assembly, a battery module, a battery pack, and a device using the battery module as a power supply.

BACKGROUND

Nowadays, all original equipment manufacturers in the automobile industry are developing in the direction of coupe, and the traditional modified electric vehicles should also reflect the advantages and characteristics of rapid acceleration of the electric vehicles. Therefore, the demand for rapid acceleration conditions will become increasingly common, and the requirements on the module grouping efficiency, structure strength and safety performance of the battery module will become higher and higher.

An insulating film is paved on one side of a connecting sheet of the battery module. When battery cells expand during charging and discharging, relative displacement between the battery cells will occur, and the insulating film may be torn under the action of an expanding force, resulting in exposure of the connecting sheet and shortcircuit risk.

SUMMARY

An objective of the present application is to provide a connecting assembly, a battery module, a battery pack, and a device using the battery module as a power supply, so as to improve the safety of the battery module.

The present application in a first aspect provides a connecting assembly for a battery module, and including: a plurality of connecting sheets, where each of the plurality of connecting sheets includes an adjusting portion and a connecting portion, the adjusting portion is configured as a protrusion connected between adjacent connecting portions, and the connecting portion is configured to connect a battery cell of the battery module; and an insulating film, disposed on one side of the plurality of connecting sheets and provided with a through hole disposed corresponding to the adjusting portion.

In some embodiments, the through hole includes a first through hole; and the through hole is located at the adjusting portion, and the first through hole is configured to accommodate the adjusting portion.

In some embodiments, the projection area of first through hole on a plane where connecting portion is located is greater than the projection area of the adjusting portion on the plane where connecting portion is located.

In some embodiments, the through hole includes a second through hole; and the second through hole is located at the adjusting portion, and the second through hole includes a protruded portion attached to the adjusting portion.

In some embodiments, the protruded portion is connected to an inner side of a hole wall of the second through hole and extends towards the adjusting portion.

In some embodiments, the protruded portion is connected to the inner side of the hole wall of the second through hole located in a length direction.

In some embodiments, the protruded portion is a tongue-shaped structure or a square structure.

In some embodiments, a width of the second through hole is greater than or equal to a width of the adjusting portion.

In some embodiments, the through hole includes a third through hole; and the third through hole is located at the connecting portion, and the third through hole is disposed close to the adjusting portion.

In some embodiments, the third through holes are symmetrically distributed on two sides of the adjusting portion.

In some embodiments, the insulating film includes a first insulating film and a second insulating film which are disposed on two sides of the plurality of connecting sheets respectively; and first insulating film and the second insulating film are both provided with through hole.

In some embodiments, one insulating film of the first insulating film and the second insulating film is provided with a first through hole, and the other insulating film is provided with a second through hole or a third through hole; the first through hole is located at the adjusting portion, and the first through hole is configured to accommodate the adjusting portion; the second through hole is located at the adjusting portion, and the second through hole includes a protruded portion attached to the adjusting portion; and the third through hole is located at the connecting portion, and the third through hole is disposed close to the adjusting portion.

In some embodiments, the connecting assembly further includes a sampling assembly, where the sampling assembly is connected to the plurality of connecting sheets, and the sampling assembly and the plurality of connecting sheets are connected into an integrated structure through the insulating film.

The present application in a second aspect provides a battery module, including a plurality of stacked battery cells and the connecting assembly provided by the first aspect of the present application, where the plurality of connecting sheets are connected to electrode leads of the plurality of battery cells.

The present application in a third aspect provides a battery pack, including a box body and the battery module provided by the second aspect of the present application, where the battery module is accommodated in the box body.

The present application in a fourth aspect provides a device using a battery module as a power supply, including a driving device and the battery module provided by the second aspect of the present application, where the driving device is configured to provide a driving force for the device, and battery module is configured to provide electric energy to the driving device.

Based on the technical solution provided by the present application, the connecting assembly includes a plurality of connecting sheets and an insulating film, where each of the plurality of connecting sheets includes an adjusting portion and a connecting portion, the adjusting portion is configured as a protrusion connected between adjacent connecting portions, the connecting portion is configured to connect a battery cell of the battery module, and the insulating film is disposed on one side of each of the plurality of connecting sheets, and the insulating film is provided with a through hole disposed corresponding to the adjusting portion. When the connecting sheets and the insulating film are integrally formed, since the adjusting portions is set as the protrusion, the through hole may improve the ductility of the insulating film at the protrusion, so that the problem that the insulating film is wrinkled and torn by the protrusion is avoided, and the manufacturing efficiency of the connecting assembly can be improved. When the connecting assembly is applied to the battery module, since the battery cell expands and moves in the charging and discharging process, the adjusting portion deforms with the movement of the battery cell, and the through hole formed in the insulating film can release an expanding force, thereby preventing the insulating film from being torn, reducing the shortcircuit risk of the exposed connecting sheet and other parts and improving the safety performance of the connecting assembly and the battery module.

Other features and advantages of the present application will become apparent by the detailed description for exemplary embodiments of the present application with reference to the following accompany drawings.

BRIEF DESCRIPTION OF THE DRAWINGS

The drawings described herein are used to provide a further understanding of the present application and form a part of the present application. The schematic embodiments and descriptions of the present application are used to explain the present application and do not constitute an undue limitation on the present application. In the drawings.

Figure 1:
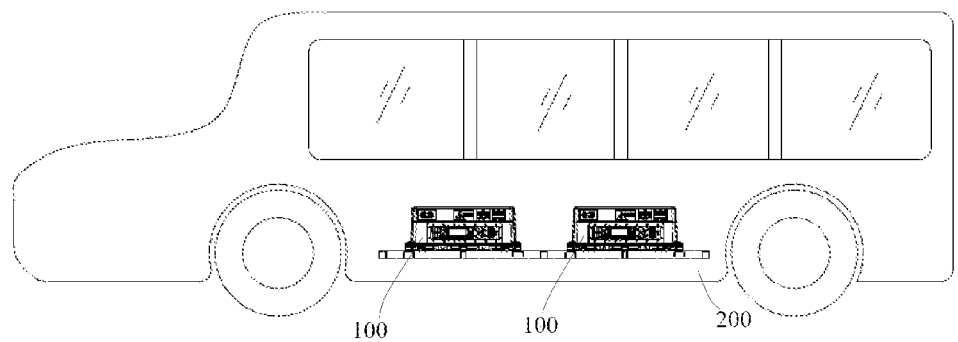
FIG. 1 is a structural schematic diagram of a vehicle according to an embodiment of the present application.

The reference numerals of the drawings respectively represent:

1. Connecting assembly;
11. Connecting sheet; 111. Adjusting portion; 112. Connecting portion; 112a. Positioning hole;
12. First insulating film;
13. Second insulating film;
14. Sampling assembly; 141. Circuit board; 142. Sampling terminal;
2. End plate;
3. Insulating cover;
4. Battery cell; 41. Positive electrode lead; 42. Negative electrode lead;
5. First ribbon;
6. Second ribbon;
10. Battery module;
20. Upper box body;
30. Lower box body;
100. Battery pack;
H. Through hole;
H1. First through hole;
H2. Second through hole; T. Protruded portion;
H3. Third through hole;
X1. Length direction of battery module; Y1. Width direction of battery module; Z1. Height direction of battery module;
X2. Length direction of connecting assembly; Y2. Width direction of connecting assembly; Z2. Height direction of connecting assembly;
X3. Length direction of connecting sheet; Y3. Width direction of connecting sheet;
X4. Length direction of through hole; Y4. Width direction of through hole.
$p_0$. Length direction of adjusting portion; $q_0$. Width of adjusting portion;
$p_1$. Length of first through hole; $q_1$. Width of first through hole;
$p_2$. Length of second through hole; $q_2$. Width of second through hole;
$p_3$. Length of third through hole; $q_3$. Width of third through hole;
a. gap between the second through hole and the adjusting portion;
b. distance between a hole wall of the third through hole close to one side of the adjusting portion and an edge of the adjusting portion;
c. distance between hole walls, close to each other, of the third through hole disposed in the second insulating film and the first through hole disposed in the first insulating film.

DESCRIPTION OF EMBODIMENTS

The technical solutions in the embodiments of the present application will be clearly and completely described below in conjunction with the accompanying drawings in the embodiments of the present application. Apparently, the embodiments described are merely a part of embodiments of the present application, instead of all embodiments. The following description of the at least one exemplary embodiment is actually merely illustrative and never constitutes any limitation to the present application and application or use thereof. All other embodiments obtained by those of ordinary skill in the art based on the embodiments in the present application without creative efforts should fall within the protection scope of the present application.

Unless otherwise specified, relative arrangement, numerical expressions and values of parts and steps described in the embodiments do not limit the scope of the present application. Meanwhile, it should be understood that for the convenience of description, the dimensions of each part shown in the accompanying drawings are not drawn according to the actual proportional relationship. Technologies, methods and devices known to those of ordinary skill in the related field may not be discussed in detail, but, where appropriate, the technologies, methods and devices should be regarded as a part of the authorized specification. In all the examples shown and discussed herein, any specific value should be interpreted as merely exemplary rather than a limitation. Therefore, other examples of the exemplary embodiments may have different values. It should be noted that similar reference numerals and letters represent similar items in the accompanying drawings below. Therefore, once an item is defined in one drawing, it is unnecessary to further discuss the item in the subsequent drawings.

For convenience of description, spatial relative terms, such as "above", "over", "on an upper surface of", "on" and the like, may be used herein to describe a spatial position relationship between one device or feature and other devices or features shown in the figure. It should be understood that the spatial relative terms are intended to include different orientations in use or operation in addition to the orientations of the devices described in the figures. For example, if the device in the drawings is inverted, the device described as "above other devices or structures" or "over other devices or structures" will be positioned as "below other devices or structures" or "under other devices or structures". Therefore, the exemplary terms "above" may include two orientations: "above" and "below". The device may also be positioned in other different ways (rotating by 90 degrees or located at other orientations), and the spatial relative description used herein will be explained accordingly.

The structure of a battery module in the embodiments of the present application and the structure of a connecting assembly of the embodiments are described in detail according to FIG. 1 to FIG. 16.

The embodiments of the present application provides a device using a battery module 10 as a power supply, a battery pack 100, the battery module 10 and a connecting assembly 1. The device using the battery module 10 as the power supply includes the battery module 10 and a driving device for providing a driving force to the device, where the battery module 10 provides electric energy to the driving device. The driving force of the device may be all electric energy, or may be part of electric energy and part of other energy (such as mechanical energy). For example, the device may also include a power source for providing the mechanical energy, such as an engine, as long as the device using the battery module 10 as the power supply is within in the protection scope of the present application.

The device in the embodiments of the present application may be a moving device such as a vehicle, a ship, a small airplane and the like. Taking the vehicle as an example, the vehicle in the embodiments of the present application may be a new energy vehicle. The new energy vehicle may be a battery electric vehicle and may also be a hybrid electric vehicle or an extended-range vehicle. As shown in FIG. 1, the vehicle includes a battery pack 100 and a vehicle main body 200, where the battery pack 100 is disposed in the vehicle main body 200 and includes at least one battery module 10. The vehicle main body 200 is provided with a driving motor, the driving motor is electrically connected to the battery pack 100, the battery pack 100 provides electric energy to the driving motor, and the driving motor is connected with wheels on the vehicle main body 200 through a transmission mechanism so as to drive the vehicle to move. Specifically, the battery pack 100 may be horizontally disposed at the bottom of the vehicle main body 200.

Figure 2:
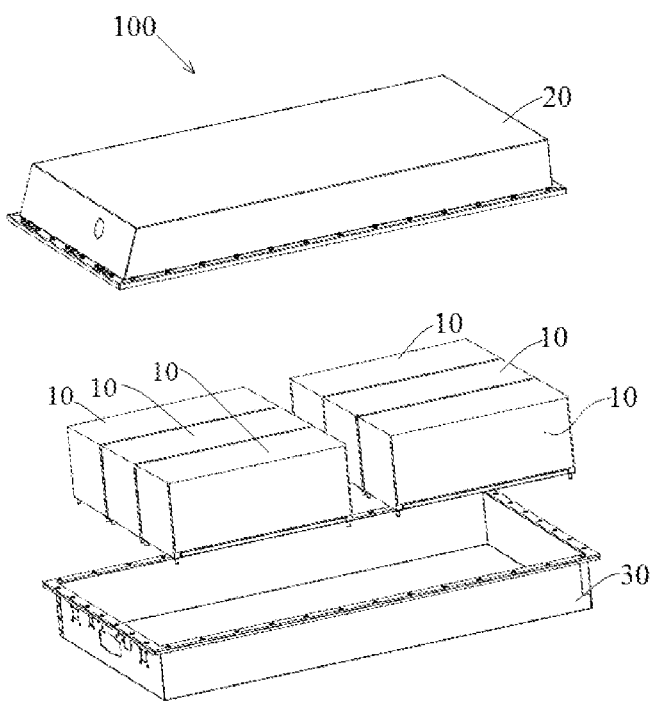
FIG. 2 is a structural schematic diagram of a battery pack in FIG. 1.

The battery pack 100 in the embodiments of the present application includes at least one battery module 10. Specifically, in this embodiment, as shown in FIG. 2, the battery pack 100 in the embodiment includes a plurality of battery modules 10 and a box body for accommodating the plurality of battery modules 10. The box body is provided with an accommodating cavity, and the plurality of battery modules 10 are arranged in the accommodating cavity. Specifically, the box body of the embodiment is a box-shaped box body, and includes a lower box body 30 for accommodating the battery module 10 and an upper box body 20 for covering the lower box body 30. In embodiments not shown in other drawings, the box body may also be of a frame shape, a disk shape and other shapes.

Figure 3:
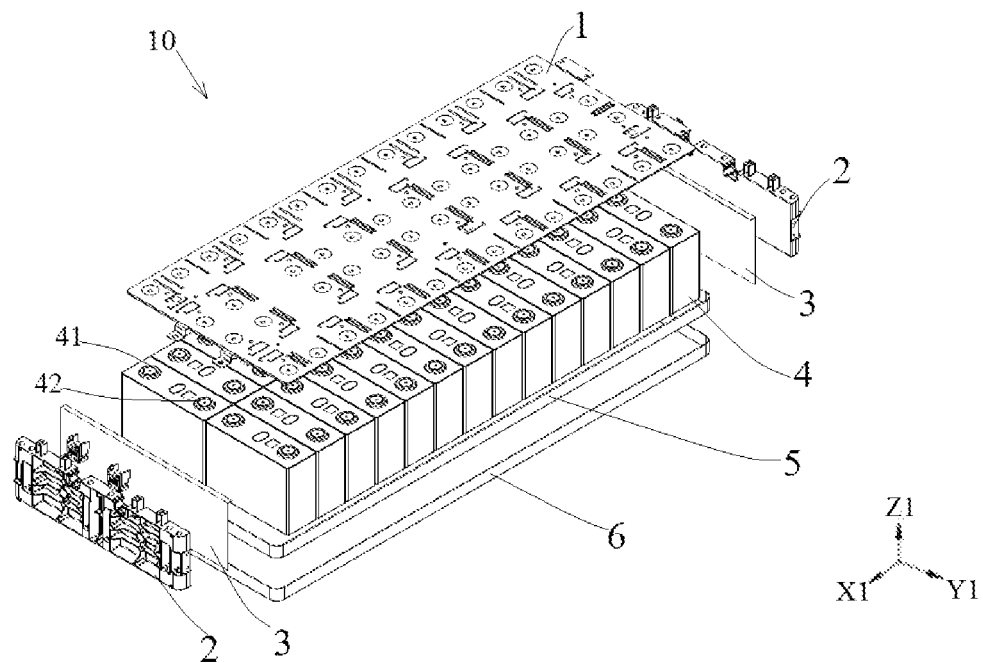
FIG. 3 is a structural schematic diagram of a battery module in FIG. 2.

As shown in FIG. 3, the battery module 10 in this embodiment of the present application includes a plurality of battery cells 4 and a frame structure for fixing the plurality of battery cells 4. The plurality of battery cells 4 are stacked and arranged in a row along a length direction X1 of the battery module 10. The frame structure includes an end plate 2, a first ribbon 5 and a second ribbon 6, where the end plate 2 is located at two ends of the battery module 10 in the length direction X1, and the end plate 2 is configured to limit the battery cell 4 to move along the length direction X1 of the battery module 10. The first ribbon 5 and the second ribbon 6 are configured to connect the plurality of stacked battery cells 4.

In other embodiments, the frame structure may also include side plates located on two sides of the battery module 10 in a width direction Y1, where the side plates and the end plate are connected to form the frame structure in a surrounding way. In addition, the battery module 10 may also not be provided with the frame structure. When the battery module is fixed in the box body of the battery pack 100, the plurality of stacked battery cells 4 are fixed through a skeleton structure of the box body, such as side edges of the box body, reinforcing beams and the like; or the battery cell 4 may also be fixed in the box body through adhesion.

The battery module 10 of this embodiment further includes an insulating cover 3, and the insulating cover 3 is disposed between the frame structure and the battery cell 4 to play an insulating role. Specifically, in this embodiment, the insulating cover 3 is located between the end plate 2 and the battery cell 4, and between the ribbon and the battery cell 4.

The battery cell 4 in the embodiments includes an electrode lead. Specifically, each battery cell 4 includes a positive electrode lead 41 and a negative electrode lead 42. In the battery module 10, the plurality of battery cells 4 are electrically connected through connecting sheets 11. The plurality of battery cells 4 may be connected through the connecting sheet 11 in series or in parallel. For example, when the battery cells 4 are connected in series, the positive electrode lead 41 of one battery cell 4 and the negative electrode lead 42 of the other battery cell 4 are connected through the connecting sheet 11; or when the battery cells 4 are connected in parallel, the positive electrode lead 41 of one battery cell 4 and the positive electrode lead 41 of the other battery cell 4 are connected through the connecting sheet 11.

Figure 6:
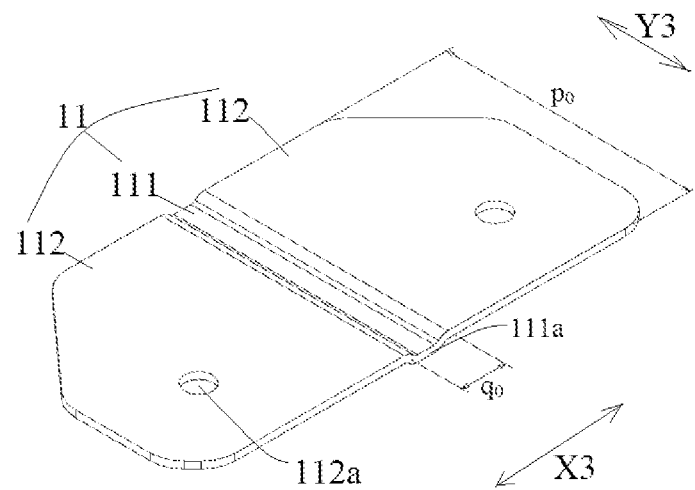
FIG. 6 is a structural schematic diagram of the connecting sheet in FIG. 5.
Figure 7:
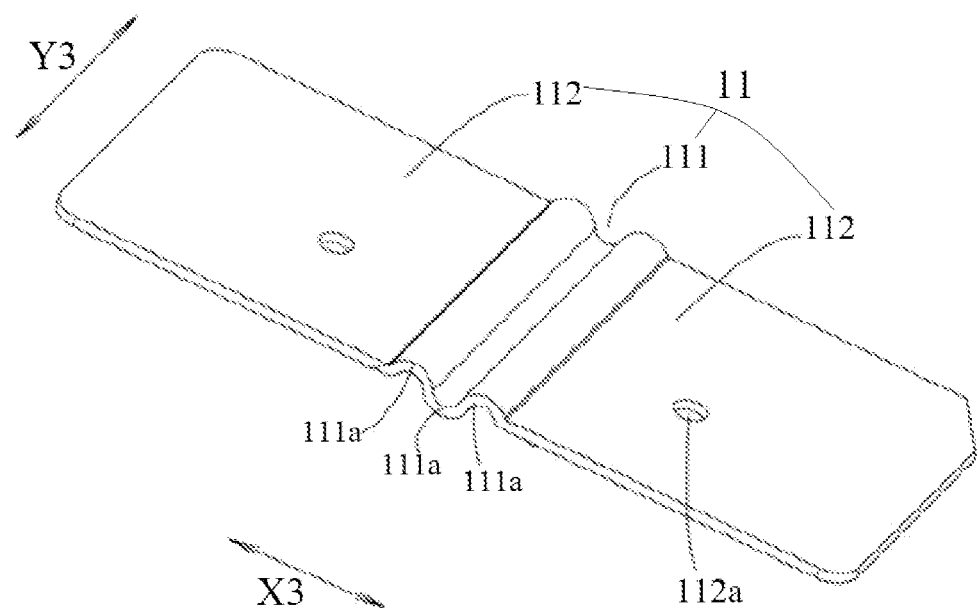
FIG. 7 is a structural schematic diagram of a connecting sheet according to another embodiment of the present application.

As shown in FIG. 6, the connecting sheet 11 of this embodiment includes an adjusting portion 111 and a connecting portion 112. Specifically, two connecting portions 112 are arranged at interval in a length direction X3 of the connecting sheet 11, the adjusting portion 111 is disposed between the two connecting portions 112, and the connecting portion 112 is configured to be connected to the electrode lead of the battery cell 4. Specifically, the connecting portion 112 is provided with a positioning hole 112a for mounting and positioning the electrode lead. The adjusting portion 111 is configured as a protrusion 111a connected between the adjacent connecting portions 112. Of course, the connecting sheet 11 of this embodiment is not limited to a case where two connecting portions 112 are provided, and there may be three or more than three connecting portions 112. If there are three connecting portions 112, there are two adjusting portions 111, and each adjusting portion 111 is located between the two adjacent connecting portions 112.

In order to avoid stress concentration between the adjusting portion 111 and the connecting portion 112, an arc transition is adopted between the adjusting portion 111 and the connecting portion 112.

Specifically, the adjusting portion 111 of this embodiment includes one protrusion 111a disposed between the two adjacent connecting portions 112, and the protrusion 111a extends in a width direction Y3 of the connecting sheet 11. As shown in FIG. 6, the adjusting portion 111 of this embodiment has a length of $p_0$ (the length $p_0$ refers to an extending dimension of the adjusting portion 111 in the width direction Y3 of the connecting sheet 11), and has a width of $q_0$ (the width $q_0$ refers to an extending dimension of the adjusting portion 111 in the length direction X3 of the connecting sheet 11). When the battery cell 4 expands during charging and discharging, the adjusting portion 111 is configured to release an expanding force. Furthermore, the protrusion 111a of the adjusting portion 111 of this embodiment is protruded towards one side of the battery cell 4, and a gap between the connecting sheet 11 and the battery cell 4 may be utilized, so that the adjusting portion 111 does not occupy redundant space, and a volume of the whole battery module 10 is reduced.

A section of the protrusion 111a of this embodiment is preferably arc-shaped.

In other embodiments, the adjusting portion 111 may also include more than two protrusions 111a which are continuously arranged in the length direction X3 of the connecting sheet 11. In the embodiment shown in FIG. 7, the adjusting portion 111 includes three protrusions 111a which are continuously arranged in the length direction X3 of the connecting sheet 11.

Figure 4:
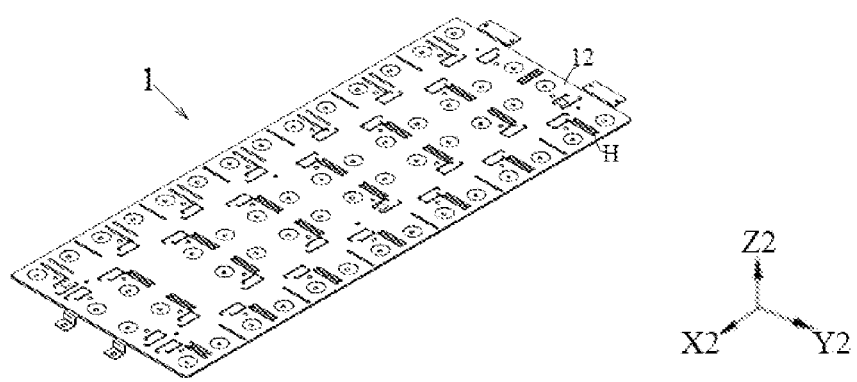
FIG. 4 is a stereoscopic structural schematic diagram of a connecting assembly in FIG. 3.
Figure 5:
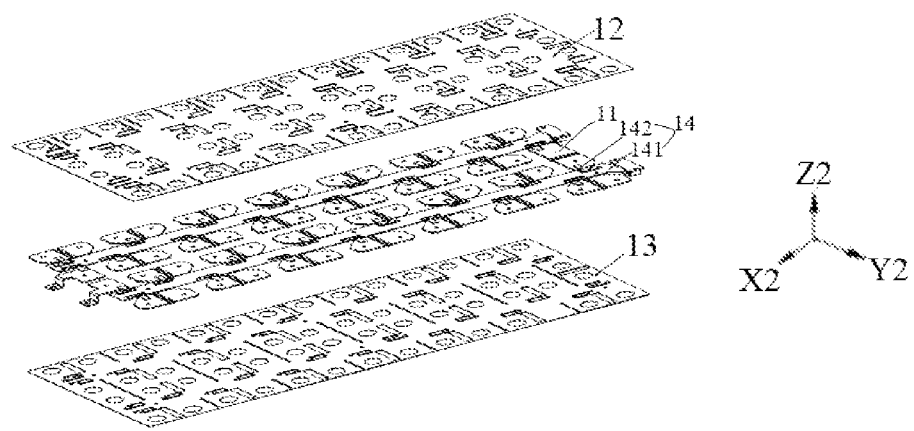
FIG. 5 is an exploded structural schematic diagram of a connecting assembly shown in FIG. 4.

As shown in FIG. 4 and FIG. 5, the connecting assembly 1 of this embodiment includes a plurality of connecting sheets 11 and an insulating film. The insulating film is disposed on one side of each of the plurality of connecting sheets 11 and is connected to the plurality of connecting sheets 11, so that the plurality of connecting sheets 11 are connected into a whole body. The plurality of connecting sheets 11 of this embodiment are connected into a whole body through the insulating film, so that the connecting assembly 1 forms an integrated structure, grouping of the battery module 10 is facilitated, and the production efficiency is improved. Specifically, the connecting assembly 1 may be integrally formed through injection molding, adhesion, hot pressing and other technologies. In some embodiments, when the insulating film is thin, the plurality of connecting sheets 11 of the connecting assembly 1 of this embodiment are integrated through the insulating film and by the hot pressing technology. Specifically, in this embodiment, an inner side of the insulating film is provided with a back adhesive, and the insulating film with the back adhesive and the connecting sheets 11 are placed on a clamp for hot pressing so as to be integrated into an integrated structure.

As shown in FIG. 5, the connecting assembly 1 of this embodiment further includes a sampling assembly 14; and the sampling assembly 14 is connected to the plurality of connecting sheets 11, and the sampling assembly 14 and the plurality of connecting sheets 11 are connected into an integrated structure through the insulating film. In this embodiment, the sampling assembly 14 and the plurality of connecting sheets 11 are connected into a whole body through the insulating film, so that the whole connecting assembly 1 becomes an integrated structure, the grouping process of the battery module 10 is further simplified, and the production efficiency is improved. Specifically, the connecting assembly 1 may be integrally formed through injection molding, adhesion, hot pressing and other technologies.

Specifically, the sampling assembly 14 of this embodiment includes a circuit board 141 and a sampling terminal 142. The sampling terminal 142 and the connecting sheet 11 are connected to sample data such as voltage and temperature of the battery cell 4 and transmit the data to the circuit board 141. Specifically, the circuit board 141 may be FPC or PCB; and the sampling terminal 142 may be a nickel sheet, a copper sheet and an aluminum sheet connected to a sampling line in the circuit board 141, or the sampling terminal 142 may also be a part extending from the sampling line in the circuit board 141. There is no specific limitation herein as long as information of the battery cell 4 can be acquired. In some embodiments, the circuit board 141 may be a flexible printed circuit. The sampling terminal 142 is a nickel sheet. As shown in FIG. 5, a length direction of the circuit board 141 of this embodiment is consistent with a length direction X2 of the connecting assembly 1, and the connecting assembly 1 of this embodiment includes two circuit boards 141 distributed in a width direction Y2 of the connecting assembly 1. In other embodiments, a length direction of the circuit board 141 may also be not consistent with the length direction X2 of the connecting assembly 1, specifically, the arrangement direction of the circuit board 141 may be adjusted according to the stacking mode of the battery cells 4.

As shown in FIG. 4, FIG. 5, FIG. 8 and FIG. 10, the insulating film is provided with a through hole H and the adjusting portion 111 are disposed correspondingly. The connecting assembly 1 of this embodiment is provided with a through hole H in the insulating film, and the position of the through hole corresponds to the position of the adjusting portion 111. When the connecting sheet 11 and the insulating film are integrally formed through hot pressing or adhesion, since the adjusting portion 111 is set as a protrusion 111a, the through hole H may improve the ductility of the insulating film at the protrusion 111a, so that the problem that the insulating film is wrinkled and torn by the protrusion 111a is avoided, and the manufacturing efficiency of the connecting assembly 1 may be improved. When the connecting assembly 1 is applied to the battery module 10, since the battery cell 4 expands and moves in the charging and discharging process, the adjusting portion 111 deforms with the movement of the battery cell 4, and the through hole H formed in the insulating film can release an expanding force, thereby preventing the insulating film from being torn, reducing the shortcircuit risk of the exposed connecting sheet 11 and other parts and improving the safety performance of the connecting assembly 1 and the battery module 10.

It should be noted that "corresponding dispose" of the through hole H formed in the insulating film and the adjusting portion 111 of this embodiment refers to: the through hole H is disposed at the adjusting portion 111, or the through hole H is close to the adjusting portion 111 and is disposed at the connecting portion 112. In addition, for the connecting sheet 11 of the embodiment shown in FIG. 7, the insulating film may be provided with a plurality of through holes H corresponding to the plurality of protrusions 111a of the adjusting portion 111 for the connecting sheet 11, or may also be provided with one through hole H corresponding to the adjusting portion 111.

In one embodiment, the through hole H includes a first through hole H1, and the first through hole H1 is located at the adjusting portion 111 and configured to accommodate the adjusting portion 111.

Figure 8:
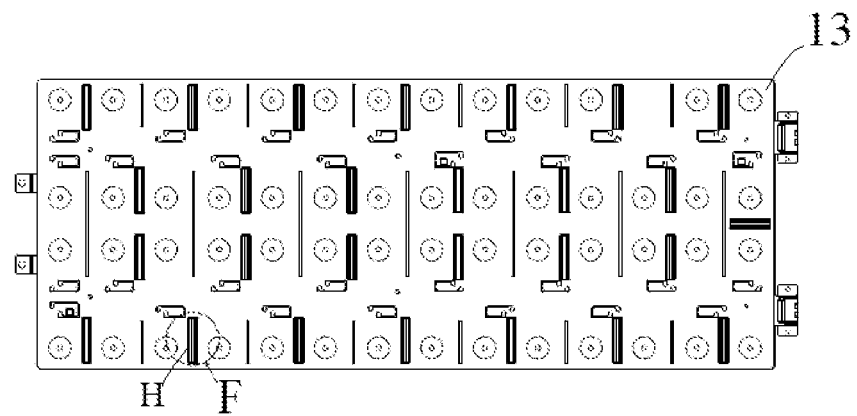
FIG. 8 is a vertical structural schematic diagram of a connecting assembly shown in FIG. 4.
Figure 9:
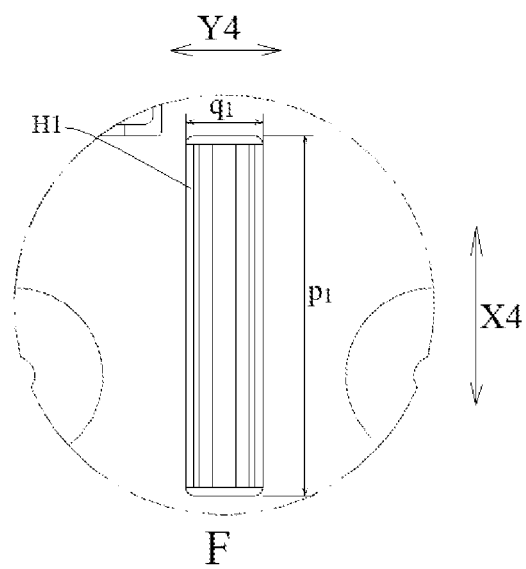
FIG. 9 is an enlarged structural schematic diagram of a part F in FIG. 8.

Specifically, in this embodiment, as shown in FIG. 8 and FIG. 9, the insulating film is provided with the first through hole H1, and the first through hole H1 is configured to accommodate the adjusting portion 111. The size of the first through hole H1 can accommodate the adjusting portion 111, so the adjusting portion 111 has an extending space during deformation. When the adjusting portion 111 deforms with the movement of the battery cell 4, the adjusting portion 111 may freely deform in the first through hole H1, thereby preventing the insulating film from being torn by the expanding force.

The adjusting portion 111 may be all accommodated in the first through hole H1, or may be partially accommodated in the first through hole H1.

In some embodiments, the projection area of the first through hole H1 on a plane where the connecting portion 112 is located is greater than the projection area of the adjusting portion 111 on the plane where the connecting portion 112 is located, so that the adjusting portion 111 is all accommodated in the first through hole H1. Specifically, as shown in FIG. 9, the first through hole H1 of this embodiment is a square hole. A length of the first through hole H1 is $p_1$ and a width of the first through hole H1 is $q_1$; and the length $p_1$ of the first through hole H1 is greater than the length $p_0$ of the adjusting portion 111, and the width $q_1$ of the first through hole H1 is greater than the width $q_0$ of the adjusting portion 111. The through hole H is set as the first through hole H1 capable of accommodating all the adjusting portion 111, so that the requirement on the positioning precision between the insulating film and the connecting sheet 11 in the hot pressing process may be reduced, and the manufacturing efficiency may be improved.

In order to prevent four corners of the first through hole H1 from generating stress concentration, the four corners of the first through hole H1 of this embodiment are all transitioned by round corners.

Since the length $p_1$ of the first through hole H1 is greater than the length $p_0$ of the adjusting portion 111, metal particles are easy to fall onto the battery cell 4 through the first through hole H1 to cause the shortcircuit problem. Of course, the length $p_1$ of the first through hole H1 may be set to be slightly greater than the length $p_0$ of the adjusting portion 111, such as 1 mm, and at this time, most of metal particles may be prevented from entering the battery module 10. However, this requires that the device for manufacturing the connecting assembly 1 has higher precision, and the metal particles are blocked by accurately controlling the distance between the first through hole H1 and the adjusting portion 111.

The length $p_1$ of the first through hole H1 may be set to less than the length $p_0$ of the adjusting portion 111 so as to ensure that there is no gap between the insulating film and the edge of the adjusting portion 111 of the connecting sheet 11 to prevent the metal particles from falling off. When the length $p_1$ of the first through hole H1 is less than the length $p_0$ of the adjusting portion 111, the adjusting portion 111 is partially accommodated in the first through hole H1. In this way, the free extension space of the adjusting portion 111 is reduced. Moreover, due to the limited ductility of the insulating film during hot pressing and low connection strength between the hot-pressed insulating film and the adjusting portion 111, there is a risk that the insulating film connected to the adjusting portion 111 will be torn in the expanding process of the battery cell 4.

Figure 11:
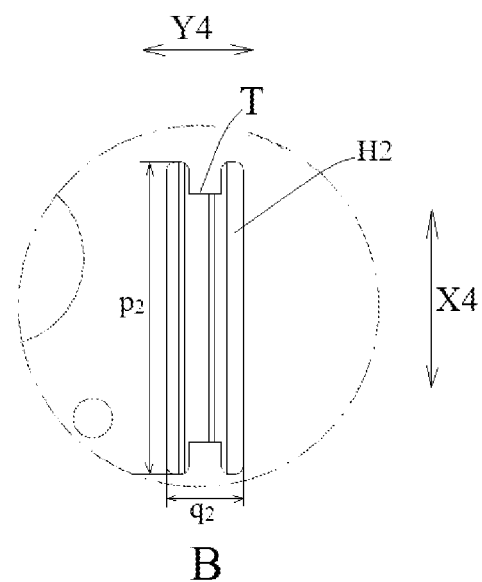
FIG. 11 is an enlarged structural schematic diagram of a part B in FIG. 10.
Figure 12:
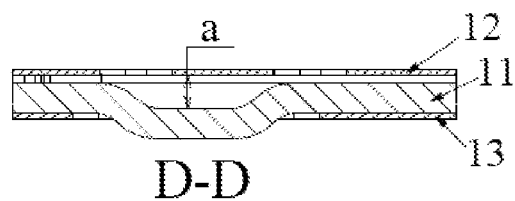
FIG. 12 is a D-D section structural schematic diagram in FIG. 10.
Figure 13:
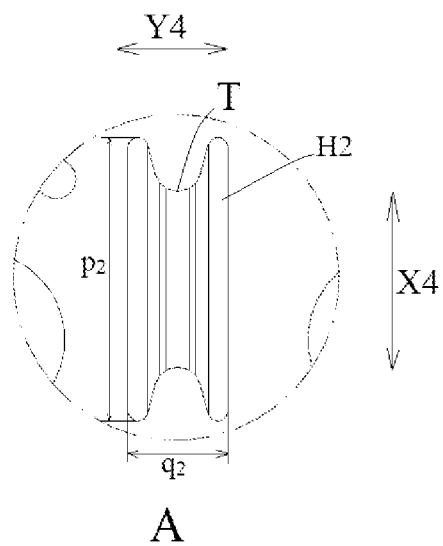
FIG. 13 is an enlarged structural schematic diagram of the part A in FIG. 10.

In order to solve the above problem, in a possible design, the through hole H includes a second through hole H2, where the second through hole H2 is located at the adjusting portion 111, the second through hole H2 includes a protruded portion T attached to the adjusting portion 111, and the protruded portion T covers a gap a between the second through hole H2 and the adjusting portion 111. The protruded portion T is attached to the adjusting portion 111 so as to better ensure that the insulating film can be attached to the adjusting portion 111 better; moreover, the protruded portion T covers the gap a between the second through hole H1 and the adjusting portion 111 so as to better prevent the metal particles from falling into the battery cell 4 through the gap between the insulating film and the adjusting portion 111.

as shown in FIG. 11 and FIG. 13, the protruded portion Tin this embodiment is connected to an inner side of the hole wall of the second through hole H2, extends towards the adjusting portion 111 and is attached to the adjusting portion 111 so as to cover the gap a between the second through hole H2 and the adjusting portion 111.

Specifically, in this embodiment, as shown in FIG. 11 and FIG. 13, the protruded portion T is located at the inner side of the hole wall of the second through hole H2 located in a length direction X4.

In other embodiments, the protruded portion T may also be disposed on the inner side of the hole wall of the second through hole H2 located in a width direction Y4.

As shown in FIG. 11, the protruded portion T is of a square structure.

In some embodiments, since the section of the protrusion 111a of the adjusting portion 111 is arc-shaped, in order to be better attached to the protrusion 111a, as shown in FIG. 13, preferably, the protruded portion T is a tongue-shaped structure. Two side edges of the tongue-shaped structure gradually approach to the middle of the second through hole H2, thus facilitating attachment between the protruded portion T and the protrusion 111a.

In some embodiments, the length $p_2$ of the second through hole H2 is less than the length $p_0$ of the adjusting portion 111, thereby ensuring that there is no gap between the insulating film and the edge of the adjusting portion 111 of the connecting sheet 11 to prevent the metal particles from falling off.

In this embodiment, the width $q_2$ of the second through hole H2 is greater than, equal to or slightly less than the width $q_0$ of the adjusting portion 111 for releasing an expanding force. In some embodiments, in order to reduce the positioning difficulty to facilitate hot pressing manufacturing, the width $q_2$ of the second through hole H2 is greater than the width $q_0$ of the adjusting portion 111.

In order to prevent stress concentration, the edges of the second through holes H2 of this embodiment are slowly transitioned by arcs.

In order to prevent the insulating film from being torn, in another embodiment, the through hole H may also be a third through hole H3. The third through hole H3 is located at the connecting portion 112, and the third through hole H3 is arranged close to the adjusting portion 111. That is, the third through hole H3 is located on one side of the adjusting portion 111 in the length direction X3 of the connecting sheet 11 to avoid the adjusting portion 111, thereby preventing the metal particles from falling into the battery module 10.

Figure 15:
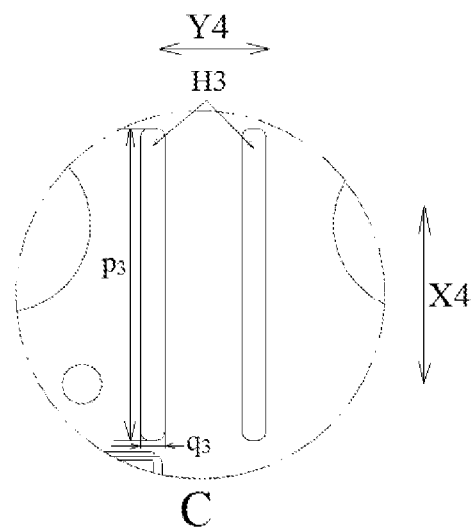
FIG. 15 is an enlarged structural schematic diagram of the part C in FIG. 10.
Figure 16:
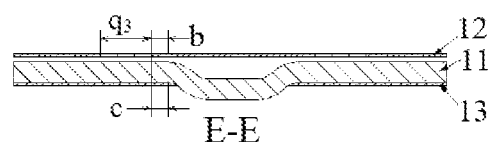
FIG. 16 is an E-E section structural schematic diagram in FIG. 10.

Specifically, in this embodiment, as shown in FIG. 15 and FIG. 16, the insulating film of this embodiment is provided with two third through holes H3 which are respectively located on two sides of the adjusting portion 111 in the length direction X3 of the connecting sheet 11. The two third through holes H3 are disposed correspondingly on two sides of the adjusting portion 111 are more favorable for releasing the expanding force.

In some embodiments, the two third through holes H3 are symmetrically disposed.

In other embodiments, more than three third through holes H3 may be provided, and a plurality of the third through holes H3 may further improve the flexibility of the connecting assembly 1 and reduce the risk that the insulating film is torn. However, too many third through holes H3 will reduce the hot pressing area of the insulating film and improve the complexity of a mold. Therefore, the number of the third through holes H3 may be properly adjusted according to the actual situation.

As shown in FIG. 15, the third through hole H3 of this embodiment is a square hole. The length $p_3$ of the third through hole H3 is less than or equal to the width of the connecting portion 112 (the extending dimension of the connecting portion 112 in the width direction Y3 of the connecting sheet 11). The third through hole H3 is covered with the connecting portion 112, so the metal particles may be prevented from falling into the battery module 10; or the length $p_3$ of the third through hole H3 is slightly greater than the width of the connecting portion 112, such as 1 mm, so most of the metal particles may be prevented from falling. In this embodiment, as shown in FIG. 6, the width of the connecting portion 112 is equal to the length of the adjusting portion 111, and both are $p_0$.

The width $q_3$ of the third through hole H3 is greater than or equal to 0.5 mm, and at this time, the manufacturability of the mold and the effect of releasing the expanding force are better. If the width is too small, the life and the manufacturability of the mold will be affected.

In order to effectively ensure that the metal particles do not fall off from the adjusting portion 111, the distance b between one side of the third through hole H3 of this embodiment close to the adjusting portion 111 and the edge of the adjusting portion is greater than or equal to 0.

Four corners of the third through hole H3 of the embodiment are all transitioned by round corners so as to prevent stress concentration.

Specifically, the insulating film may be provided with the first through hole H1 or the second through hole H2 or the third through hole H3 according to different situations. Of course, the insulating film may be provided with the first through hole H1, the second through hole H2 and the third through hole H3 simultaneously.

In order to improve the connecting strength of the connecting assembly 1, as shown in FIG. 5, the insulating film of this embodiment includes a first insulating film 12 and a second insulating film 13 which are disposed on two sides of the plurality of connecting sheets 11 and the sampling assembly 14 respectively. That is, the plurality of connecting sheets 11 and the sampling assembly 14 are located between the first insulating film 12 and the second insulating film 13. Specifically, in this embodiment, the first insulating film 12, the sampling assembly 14, the plurality of connecting sheet 11 and the second insulating film 13 are integrated by hot pressing.

Figure 10:
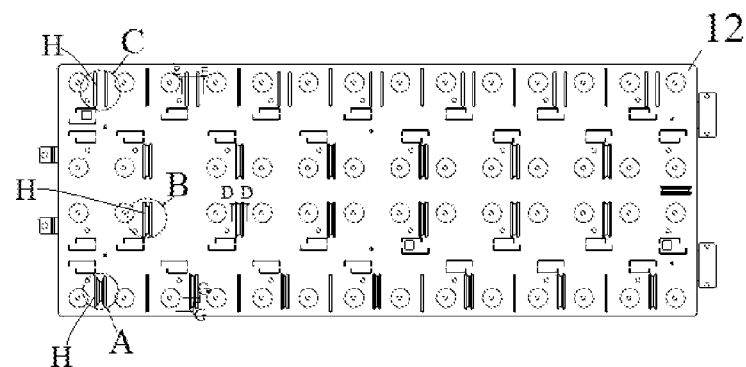
FIG. 10 is a vertical structural schematic diagram of a connecting assembly shown in FIG. 4.

Further, in order to improve the manufacturing efficiency of the connecting assembly 1 and avoid the safety problem caused by the fact that the insulating film is torn when the battery cell 4 expands during charging and discharging, as shown in FIG. 8 and FIG. 10, the first insulating film 12 and the second insulating film 13 of this embodiment may be provided with through holes H, so that the flexibility of the connecting assembly 1 may be improved, and the insulating film of the connecting assembly 1 may be prevented from being torn during manufacturing and use. Specifically, as shown in FIG. 5, the first insulating film 12 is disposed on upper sides of the connecting sheet 11 and the sampling assembly 14, and the second insulating film 13 is disposed on lower sides of the connecting sheet 11 and the sampling assembly 14. That is, in this embodiment, the first insulating film 12, the connecting sheet 11, the sampling assembly and the second insulating film 13 are disposed sequentially in a height direction Z2 of the connecting assembly 1.

Figure 14:
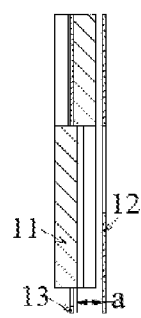
FIG. 14 is a G-G section structural schematic diagram in FIG. 10.

In a possible design, the first insulating film 12 is provided with a second through hole H2, and the second insulating film 13 is provided with a first through hole H1. Specifically, as shown in FIG. 8 and FIG. 9, the first through hole H1 is located at the adjusting portion 111, and the first through hole H1 is configured to accommodate the adjusting portion 111. As shown in FIG. 10 and FIG. 14, the second through hole H2 is located at the adjusting portion 111, the inner side of the hole wall of the second through hole H2 is connected to a protruded portion T, and the protruded portion T extends towards the adjusting portion 111 and is attached to the adjusting portion 111 so as to cover a gap a between the second through hole H2 and the adjusting portion 111.

Specifically, as shown in FIG. 9, the first through hole H1 is located at the adjusting portion 111, and the first through hole H1 of this embodiment is a square hole. The length pi of the first through hole H1 is greater than the length $p_0$ of the adjusting portion 111, and the width qi of the first through hole H1 is greater than the width $q_0$ of the adjusting portion 111, so that the adjusting portion 111 is accommodated in the first through hole H1. Since the length $p_1$ of the first through hole H1 is greater than the length $p_0$ of the adjusting portion 111, metal particles are easy to fall onto the battery cell 4 through the first through hole H1 to cause the shortcircuit problem.

Further, the first insulating film 12 is provided with the second through hole H2, the second through hole H2 is located at the adjusting portion 111, and the second through hole H2 includes the protruded portion T attached to the adjusting portion 111. As shown in FIG. 11 and FIG. 13, the second through hole H2 is located at the adjusting portion 111, and the length $p_2$ of the second through hole H2 is less than the length $p_0$ of the adjusting portion 111, so that the metal particles are prevented from falling into the battery module 10 through the gap between the adjusting portion 111 and the first through hole H1. Further, the inner side of the hole wall of the second through hole H2 of this embodiment is connected to the protruded portion T, and the protruded portion T extends towards the adjusting portion 111 and is attached to the adjusting portion 111 so as to cover the gap a between the second through hole H2 and the adjusting portion 111, so that the attaching strength between the insulating film and the adjusting portion 111 is improved, and the metal particles are prevented from falling into the battery module 10 through the gap a between the second through hole H2 and the adjusting portion 111.

In another possible design, the first insulating film 12 is provided with a third through hole H3, and the second insulating film 13 is provided with a first through hole H1. Specifically, as shown in FIG. 8 and FIG. 9, the first through hole H1 is located at the adjusting portion 111, and the first through hole H1 is configured to accommodate the adjusting portion 111. As shown in FIG. 10, FIG. 15 and FIG. 16, the third through hole H3 is located at the connecting portion 112, and the third through hole H3 is arranged close to the adjusting portion 111. That is, the third through hole H3 is located on one side of the adjusting portion 111 in the length direction X3 of the connecting sheet 11 to avoid the adjusting portion 111, thereby preventing the metal particles from falling into the battery module 10.

Specifically, the second insulating film 13 is provided with the first through hole H1, the first through hole H1 is located at the adjusting portion 111, and the first through hole H1 is configured to accommodate the adjusting portion 111. As shown in FIG. 9, the first through hole H1 of this embodiment is a square hole. Moreover, the length $p_1$ of the first through hole H1 is greater than the length $p_0$ of the adjusting portion 111, and the width $q_1$ of the first through hole H1 is greater than the width $q_0$ of the adjusting portion 111, so that the adjusting portion 111 is accommodated in the first through hole H1. Since the length $p_1$ of the first through hole H1 is greater than the length $p_0$ of the adjusting portion 111, metal particles are easy to fall onto the battery cell 4 through the first through hole H1 to cause the shortcircuit problem.

Further, the first insulating film 12 is provided with the third through hole H3, the third through hole H3 is located at the connecting portion 112, and the third through hole H3 is arranged close to the adjusting portion 111, so that the risk that the metal particles fall into the battery cell 4 is reduced while the flexibility of the connecting assembly 1 is improved. As shown in FIG. 15 and FIG. 16, the first insulating film 12 of this embodiment is provided with two third through holes H3, and the two third through holes H3 are located on two sides of the adjusting portion 111 in the length direction X3 of the connecting sheet 11 respectively.

As shown in FIG. 15, the third through hole of this embodiment is a square hole. 1) When the length $p_3$ of the third through hole H3 is less than or equal to the length of the connecting portion 112, the third through hole H3 is covered with the connecting portion 112 and the metal particles may be prevented from falling into the battery module 10, so a distance c between the hole walls, close to each other, of the third through hole H3 disposed on the second insulating film 13 and the first through hole H1 disposed on the first insulating film 12 is not required; and 2) when the length $p_3$ of the third through hole H3 is greater than the length of the connecting portion 112, the metal particles can fall into the battery cell 4 through the third through hole H3, at this time, a distance c between the hole walls, close to each other, of the third through hole H3 on the first insulating film 12 and the first through hole H1 on the second insulating film 13 is required to be greater than or equal to −1 mm, when c is between −1 mm and 0 mm, that is, there is a gap of 0 to 1 mm between the first insulating film 12 and the second insulating film 13, at this time, most of metal particles may still be prevented from entering, for example, c≥0.

In summary, in order to prevent the metal particles from falling into the battery module 10, as shown in FIG. 10, the through hole H in the first insulating film 12 may be the second through hole H2, and may also be the third through hole H3. Specifically, in this embodiment, the first insulating film 12 is provided with the second through hole H2 and is also provided with the third through hole H3.

Finally, it should be noted that the above embodiments are only used to describe the technical solution of the present application, but not to limit the technical solution; although the present application is described in detail with reference to the preferred embodiment, those of ordinary skill in the art should understand that: the specific embodiments of the present application may still be modified or part of technical features may be equivalently substituted; and the modifications or equivalent substitutions should be covered within the scope of the technical solutions claimed by the present application.

What is claimed is:

1. A connecting assembly for a battery module, comprising:
   a plurality of connecting sheets, wherein each of the plurality of connecting sheets comprises an adjusting portion and a connecting portion, the adjusting portion is configured as a protrusion connected between adjacent connecting portions, and the connecting portion is configured to connect a battery cell of the battery module; and
   an insulating film, disposed on one side of each of the plurality of connecting sheets and provided with a through hole disposed corresponding to the adjusting portion;
   wherein the through hole comprises a second through hole, the second through hole is located at the adjusting portion, and the second through hole comprises a protruded portion attached to the adjusting portion.

2. The connecting assembly according to claim 1, wherein the protruded portion is connected to an inner side of a hole wall of the second through hole and extends towards the adjusting portion.

3. The connecting assembly according to claim 2, wherein the protruded portion is connected to the inner side of the hole wall of the second through hole located in a length direction.

4. The connecting assembly according to claim 1, wherein the protruded portion is a tongue-shaped structure or a square structure.

5. The connecting assembly according to claim 1, wherein a width of the second through hole is greater than or equal to a width of the adjusting portion.

6. The connecting assembly according to claim 1, wherein the protruded portion covers a gap a between the second through hole and the adjusting portion.

7. The connecting assembly according to claim 1, wherein the insulating film comprises a first insulating film and a second insulating film which are disposed on two sides of the plurality of connecting sheets respectively, and the first insulating film and the second insulating film are both provided with the through hole.

8. The connecting assembly according to claim 1, further comprising a sampling assembly, wherein the sampling assembly is connected to the plurality of connecting sheets, and the sampling assembly and the plurality of connecting sheets are connected into an integrated structure through the insulating film.

9. The connecting assembly according to claim 1, wherein an arc transition is adopted between the adjusting portion and the connecting portion.

10. The connecting assembly according to claim 1, wherein the section of the protrusion of the adjusting portion is arc-shaped.

11. A battery module, comprising a plurality of stacked battery cells and the connecting assembly as defined in claim 1, wherein the plurality of connecting sheets are connected to electrode leads of the plurality of battery cells.

12. A battery pack, comprising a box body and the battery module as defined in claim 11, wherein the battery module is accommodated in the box body.

13. A device using a battery module as a power supply, the device comprising a driving device and the battery module as defined in claim 11, wherein the driving device is configured to provide a driving force for the device, and the battery module is configured to provide electric energy to the driving device.

* * * * *